United States Patent
Dai et al.

(10) Patent No.: US 12,549,999 B2
(45) Date of Patent: Feb. 10, 2026

(54) METHOD AND APPARATUS FOR MULTICAST AND BROADCAST SERVICES

(71) Applicant: Lenovo (Beijing) Limited, Beijing (CN)

(72) Inventors: Mingzeng Dai, Shanghai (CN); Haiming Wang, Beijing (CN); Lianhai Wu, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 405 days.

(21) Appl. No.: 18/246,295

(22) PCT Filed: Sep. 25, 2020

(86) PCT No.: PCT/CN2020/117866
§ 371 (c)(1),
(2) Date: Mar. 22, 2023

(87) PCT Pub. No.: WO2022/061751
PCT Pub. Date: Mar. 31, 2022

(65) Prior Publication Data
US 2023/0362721 A1   Nov. 9, 2023

(51) Int. Cl.
*H04W 28/04* (2009.01)
*H04L 1/1607* (2023.01)
*H04L 5/00* (2006.01)

(52) U.S. Cl.
CPC ........... *H04W 28/04* (2013.01); *H04L 1/1685* (2013.01); *H04L 5/0053* (2013.01)

(58) Field of Classification Search
CPC ..... H04W 28/04; H04L 1/1685; H04L 5/0053
See application file for complete search history.

(56) References Cited

U.S. PATENT DOCUMENTS

| | | | | |
|---|---|---|---|---|
| 12,317,359 | B2* | 5/2025 | Dong | H04W 72/12 |
| 2002/0071407 | A1* | 6/2002 | Koo | H04L 1/1887 |
| | | | | 370/335 |

(Continued)

FOREIGN PATENT DOCUMENTS

| | | |
|---|---|---|
| CN | 101677430 A | 3/2010 |
| CN | 105247904 A | 1/2016 |
| EP | 2389018 A1 | 11/2011 |

OTHER PUBLICATIONS

U.S. Appl. No. 18/246,295, "International Preliminary Report on Patentability", U.S. Appl. No. 18/246,295, filed Apr. 6, 2023, 6 pages.

(Continued)

*Primary Examiner* — Fahmida S Chowdhury
(74) *Attorney, Agent, or Firm* — FIG. 1 Patents

(57) ABSTRACT

Embodiments of the present application relate to a method and apparatus for multicast and broadcast services (MBS). An exemplary method includes: transmitting configuration information indicating a multicast data radio bearer (M-DRB) and a dedicated radio bearer (RB) both associated with a radio link control (RLC) entity; transmitting a set of RLC data packets to one or more user equipment (UEs) via the M-DRB in a point to multipoint (PTM) mode; and receiving feedback information for the set of RLC data packets via the dedicated RB of a UE of the one or more UEs. Embodiments of the present application can support feedback information and retransmission for a specific LIE in the PTM mode.

20 Claims, 7 Drawing Sheets

(56) References Cited

U.S. PATENT DOCUMENTS

| | | | | |
|---|---|---|---|---|
| 2004/0013114 | A1* | 1/2004 | Su | H04L 47/10 |
| | | | | 370/389 |
| 2004/0165596 | A1* | 8/2004 | Garcia | H04L 47/627 |
| | | | | 370/395.42 |
| 2008/0310338 | A1* | 12/2008 | Charpenter | H04L 1/1671 |
| | | | | 370/315 |
| 2009/0028126 | A1* | 1/2009 | Meylan | H04L 47/365 |
| | | | | 370/346 |
| 2014/0056278 | A1* | 2/2014 | Marinier | H04W 52/367 |
| | | | | 370/330 |
| 2015/0098332 | A1* | 4/2015 | Eriksson | H04W 8/04 |
| | | | | 370/235 |
| 2016/0072668 | A1* | 3/2016 | Zeng | H04W 28/082 |
| | | | | 370/254 |
| 2016/0316494 | A1* | 10/2016 | Quan | H04L 9/40 |
| 2017/0325277 | A1* | 11/2017 | Fujishiro | H04W 4/06 |
| 2018/0249513 | A1* | 8/2018 | Chang | H04W 28/00 |
| 2019/0274058 | A1* | 9/2019 | Liu | H04W 28/04 |
| 2020/0045753 | A1* | 2/2020 | Dao | H04W 4/08 |
| 2020/0389867 | A1* | 12/2020 | Zeng | H04W 76/30 |
| 2021/0050953 | A1* | 2/2021 | Park | H04L 1/1864 |
| 2021/0068003 | A1* | 3/2021 | Kadiri | H04L 1/1812 |
| 2021/0100040 | A1* | 4/2021 | Bhardwaj | H04L 1/18 |
| 2021/0168570 | A1* | 6/2021 | Navratil | H04W 72/30 |
| 2021/0297289 | A1* | 9/2021 | Manolakos | H04W 52/242 |
| 2021/0321426 | A1* | 10/2021 | Lee | H04W 72/21 |
| 2021/0378053 | A1* | 12/2021 | Saily | H04W 76/40 |
| 2022/0038866 | A1* | 2/2022 | Kadiri | H04W 76/11 |
| 2022/0201528 | A1* | 6/2022 | Shin | H04L 5/0053 |
| 2022/0232523 | A1* | 7/2022 | Lee | H04L 47/125 |
| 2022/0239415 | A1* | 7/2022 | Narayanan Thangaraj | |
| | | | | H04L 1/1812 |
| 2022/0287107 | A1* | 9/2022 | Kim | H04W 72/0446 |
| 2023/0036584 | A1* | 2/2023 | Lee | H04L 1/1854 |
| 2023/0247389 | A1* | 8/2023 | Chen | H04L 1/08 |
| | | | | 370/329 |
| 2023/0353986 | A1* | 11/2023 | Mohammed Mikaeil | |
| | | | | H04W 4/06 |
| 2023/0354106 | A1* | 11/2023 | Godin | H04W 72/30 |
| 2023/0362721 | A1* | 11/2023 | Dai | H04L 1/1685 |

OTHER PUBLICATIONS

Mediatek Inc., "UE Reception Model of MBS Radio Bearer and its Dynamic PTM/PTP switch", 3GPP TSG-RAN WG2 Meeting #111 electronic, R2-2006575, Online [retrieved Mar. 15, 2023]. Retrieved from the Internet <https://www.3gpp.org/ftp/tsg_ran/WG2_RL2/TSGR2_111-e/Docs>., Aug. 2020, 15 Pages.

PCT/CN2020/117866, "International Search Report and Written Opinion", PCT Application No. PCT/CN2020/117866, Jun. 23, 2021, 7 pages.

* cited by examiner

| D/C | P | SI | R | R | SN | Oct 1 |
| SN | | | | | | Oct 2 |
| SN | | | | | | Oct 3 |
| SO | | | | | | Oct 4 |
| SO | | | | | | Oct 5 |
| Data | | | | | | Oct 6 |
| ... | | | | | | ... |
| | | | | | | Oct N |

FIG. 2

| | | | | | | |
|---|---|---|---|---|---|---|
| D/C | P | R | R | SN | | Oct 1 |
| SN | | | | | | Oct 2 |
| UE ID | | | | | | Oct 3 |
| Data ... | | | | | | ... |
| | | | | | | Oct M |

METHOD AND APPARATUS FOR MULTICAST AND BROADCAST SERVICES

TECHNICAL FIELD

Embodiments of the present application generally relate to wireless communication technology, especially to a method and apparatus for multicast and broadcast services (MBS).

BACKGROUND

In new radio (NR) Rel-17, the MBS plans to focus on a small area mixed mode multicast (also referred to as Objective A in the TR 23.757). The Objective A is about enabling general MBS services over 5G system (5GS) and the identified use cases that could benefit from this feature. These use cases include but are not limited to: public safety and mission critical, vehicle to everything (V2X) applications, transparent internet protocol version 4 (1Pv4)/internet protocol version 6 (IPv6) multicast delivery, internet protocol television (IPTV), software delivery over wireless, group communications and internet of things (IoT) applications. In these use cases, it is required to improve reliability of broadcast/multicast service via e.g. uplink (UL) feedback.

The MBS may support a point to multipoint (PTM) mode and point to point (PTP) mode (i.e., a unicast mode). In the PTM mode, a packet may be delivered to multiple user equipment (UEs) via a PTM bearer (or a leg) simultaneously. However, the feedback information and retransmitting for the packet should be UE individual.

Given the above, the industry desires an improved technology for MBS, such that feedback information and retransmission for a specific UE is supported in the PTM mode.

SUMMARY OF THE APPLICATION

Some embodiments of the present application at least provide a technical solution for MBS.

According to some embodiments of the present application, a method may include: transmitting configuration information indicating a multicast data radio bearer (M-DRB) and a dedicated radio bearer (RB) both associated with a radio link control (RLC) entity; transmitting a set of RLC data packets to one or more UEs via the M-DRB in a PTM mode; and receiving feedback information for the set of RLC data packets via the dedicated RB of a UE of the one or more UEs.

According to some other embodiments of the present application, a method may include: receiving configuration information indicating a M-DRB and a dedicated RB both associated with a RLC entity; receiving a set of RLC data packets via the M-DRB in a PTM mode; and transmitting feedback information for the set of RLC data packets via the dedicated RB.

Some embodiments of the present application also provide an apparatus, include: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

Embodiments of the present application provide a technical solution for MBS, which can at least support feedback information and retransmission for a specific UE in the PTM mode.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 2 illustrates an example of an AMD PDU according to some embodiments of the present application;

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP long term evolution (LTE) Release 8 and so on. Persons skilled in the art know very well that, with the development of network architecture and new service scenarios, the embodiments in the present application are also applicable to similar technical problems.

Figure 1:
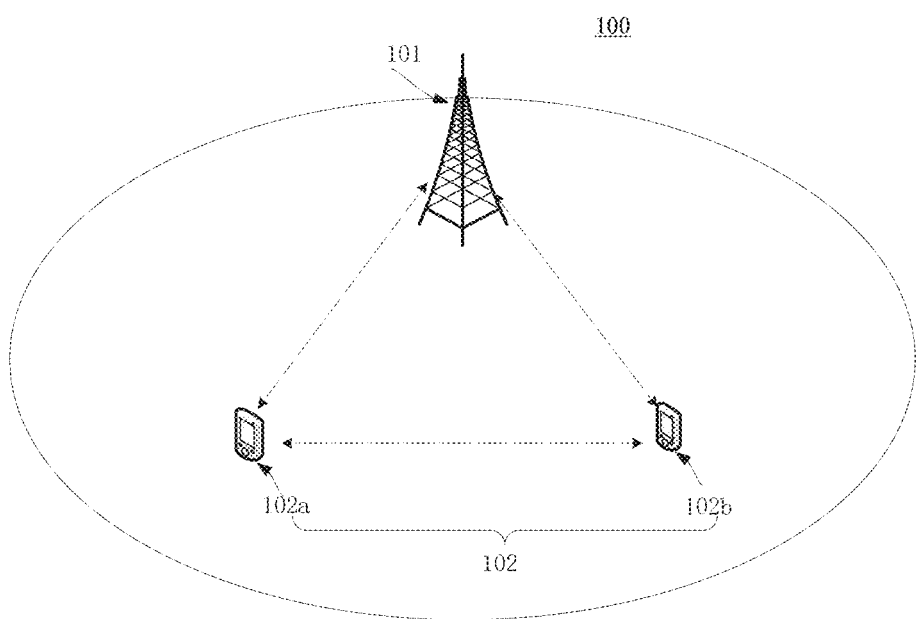
FIG. 1 is a schematic diagram illustrating an exemplary wireless communication system 100 according to some embodiments of the present application.

FIG. 1 is a schematic diagram illustrating an exemplary wireless communication system 100 according to an embodiment of the present application.

As shown in FIG. 1, a wireless communication system 100 includes at least one BS 101 and at least one UE 102. In particular, the wireless communication system 100 includes one BS 101 and two UEs 102 (e.g., a UE 102a and UE 102b) for illustrative purpose. Although a specific number of BS 101 and UEs 102 are depicted in FIG. 1, it is contemplated that any number of BSs 101 and UEs 102 may be included in the wireless communication system 100.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

The UE(s) 102 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 102(s) may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 102(s) may include wearable devices, such as smart watches, fitness bands, optical head-mounted displays, or the like. Moreover, the UE 102(s) may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS 101 may transmit the same MBS data to the UE 102a and UE 102b. For example, the MBS data may be transmitted to the UE 102a and UE 102b via a PTM mode. In another example, the MBS data may be respectively transmitted to the UE 102a and UE 102b via a PTP mode.

In the PTP mode (i.e., unicast mode), an acknowledge mode (AM) may be used in a radio link control (RLC) layer to provide high reliability. Automatic repeat-request (ARQ) is a feedback and retransmission mechanism for implementing the AM in the RLC layer.

In the ARQ procedure, a transmitting RLC entity may transmit a set of RLC data protocol data units (PDUs) to a receiving RLC entity. The set of RLC data PDUs may include one or more RLC data PDUs. Each RLC data PDU may include a header portion (also referred to as a "header" or "header field") and a data portion (also referred to as a "data field"), wherein the data portion may include a RLC service data unit (SDU) or a RLC SDU segment.

After receiving RLC data PDUs from the transmitting RLC entity, the receiving RLC entity may transmit feedback information (e.g., a RLC status report) for the set of RLC data PDUs to the transmitting RLC entity. The feedback information may be positive or negative acknowledgements of the data portion (e.g., RLC SDU, or RLC SDU segment) of the set of RLC data PDUs. In an embodiment of the present application, the feedback information may be included in a RLC status PDU. After receiving the feedback information, the transmitting RLC entity may perform retransmission of the data portion (e.g., RLC SDU, or RLC SDU segment) of the RLC data PDU(s), for which the feedback information indicates negative acknowledgement (s).

According to some embodiments of the present application, the transmitting RLC entity may initiate a polling procedure to trigger the feedback information transmitting at the receiving RLC entity. When the transmitting RLC entity initiates the polling procedure, it may transmit a polling indication to the receiving RLC entity. In an embodiment of the present application, the polling indication may be transmitted in a RLC header of an AM data (AMD) PDU.

According to some embodiments of the present application, the AMD PDU may include a data field and an AMD PDU header. The data field may include a RLC SDU or a RLC SDU segment. The AMD PDU header is byte aligned. The AMD PDU header may contain:

a data/control (D/C) field indicating whether the RLC PDU is a RLC data PDU or RLC control PDU;

a polling (P) field indicating whether or not the transmitting AM RLC entity requests a feedback information (e.g., a status report) from the receiving AM RLC entity;

a segmentation info (SI) field indicating whether a RLC PDU contains a complete RLC SDU or a segment of a RLC SDU; and a sequence number (SN) field indicating the sequence number of the corresponding RLC SDU. The SN field may have different bits for different AMD PDU formats. For example, the SN field may have 12 bits or 18 bits.

In the case that data field includes a RLC SDU segment, the AMD PDU header may also include a segment offset (SO) field indicating the position of the RLC SDU segment in bytes within the original RLC SDU.

FIG. 2 illustrates an example of an AMD PDU according to some embodiments of the present application.

Referring to FIG. 2, the size of the AMD PDU is N bytes, wherein N is an integer larger than 5. The AMD PDU includes a data field and a header field. The data field in the example of FIG. 2 may include a SDU segment. The header field may include:

a D/C field with 1 bit indicating whether the RLC PDU is a RLC data PDU or RLC control PDU; in the example of FIG. 2, the D/C field may be set to "0" to indicate that the RDU is a data PDU;

a polling filed (i.e., a P filed) with 1 bit indicating whether or not the transmitting AM RLC entity requests a feedback information (e.g., a status report) from the receiving AM RLC entity;

a SI field with 1 bit indicating whether a RLC PDU contains a complete RLC SDU or a segment of a RLC SDU;

a reserved (R) field with two bits;

a SN field with 18 bits indicating the sequence number of the corresponding RLC SDU; and a SO field with 16 bits indicating the position of the RLC SDU segment in bytes within the original RLC SDU.

The above ARQ procedure and polling procedure may be used in the PTP mode to provide high reliability. However, in the PTM mode, a packet may be delivered to multiple UEs via a PTM bearer (or a leg) simultaneously. However, the feedback information and retransmission for the packet should be UE individual. That is, how to support feedback information (e.g., a RLC status report) and data retransmission for a specific UE in the PTM mode needs to be addressed.

In addition, the polling bit (i.e., the P bit) is in the RLC header of the downlink data, which is common for all involved UEs in the PTM mode. That is, the existing polling procedure cannot be reused for individual feedback information (e.g., a RLC status report) transmission and data retransmission in the PTM mode. Therefore, how to support a polling procedure for individual feedback information and data retransmission in PTM mode also needs to be addressed.

Embodiments of the present application at least provide a technical solution for MBS, which can support feedback information and retransmission for a specific UE in the PTM mode. More details on embodiments of the present application will be illustrated in the following text in combination with the appended drawings.

Figure 3:
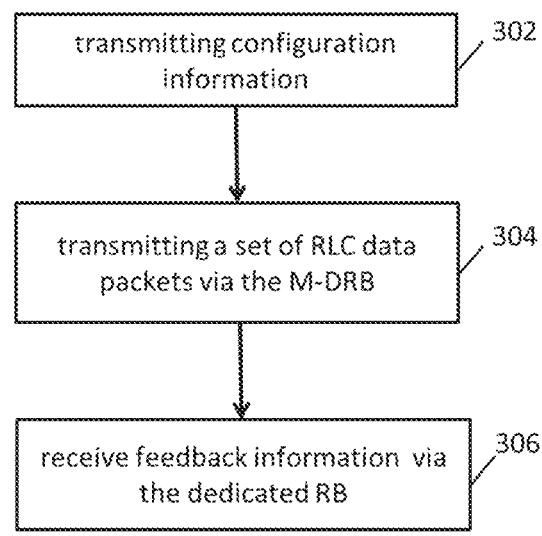
FIG. 3 is a flow chart illustrating a method for MBS according to some embodiments of the present application.

FIG. 3 is a flow chart illustrating a method for MBS according to some embodiments of the present application. The method may be performed by a BS (e.g., a BS 101 as shown in FIG. 1).

In the exemplary method shown in FIG. 3, in step 302, a BS 101 may transmit configuration information indicating a M-DRB and a dedicated RB both associated with a RLC entity to a UE 102 (e.g., the UE 102a or UE 102b) which uses a PTM mode to receive the MBS data.

The M-DRB may refer to a radio bearer or a RLC bearer or a leg associated with the RLC entity for data transmission via a PTM mode. The M-DRB is scrambled by a group radio network temporary identifier (G-RNTI) in at least one cell. The M-DRB can also be named as multicast radio bearer (MRB). The dedicated RB may refer to a radio bearer or a RLC bearer or a leg associated with the RLC entity for feedback information and retransmission for the UE 102 via a PTP mode. The dedicated RB is scrambled by the cell radio network temporary identifier (C-RNTI) of the UE.

In some embodiments, the M-DRB and the dedicated RB both associated with a RLC entity may refer to the M-DRB and the dedicated RB both associated with the same ARQ entity in the RLC entity. For example, FIG. 4 is a schematic diagram illustrating an association relationship between the ARQ and the M-DRB and dedicated RB according to some embodiments of the present application.

Figure 4:
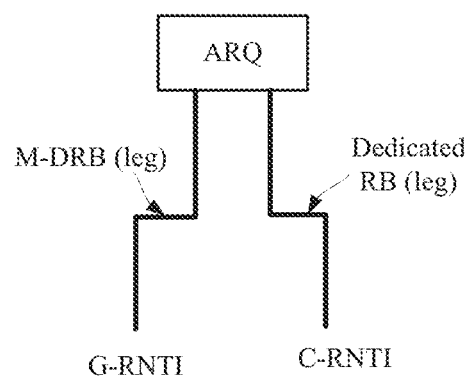
FIG. 4 is a schematic diagram illustrating an association relationship between the ARQ, and the M-DRB and dedicated RB according to some embodiments of the present application.

Referring to FIG. 4, both the M-DRB (e.g., a leg) and dedicated RB (e.g., a leg) are associated with a same ARQ entity. The M-DRB may be used for transmitting RLC data packets (e.g., RLC data PDUs) to all the UEs (e.g., the UE 102a, UE 102b and other UEs not shown in FIG. 1), which use the PTM mode to receive the RLC data packets. The dedicated RB may be used by the UE 102 (e.g., UE 102a or UE 102b) to transmit feedback information or receiving the retransmitted RLC data packets. For each UE which uses a PTM mode to receive RLC data packets, the BS 101 may indicate the association between the M-DRB and the dedicated RB to the UE, wherein both the M-DRB and the dedicated RB to the UE are associated with the same ARQ entity or the same RLC entity.

The association between the M-DRB and the dedicated RB may be indicated by associating an ID of the M-DRB and an ID of the dedicated RB with the same RLC entity or ARQ entity.

In an embodiment of the present application, the ID of the M-DRB may be a logical channel identity (LCID) and the ID of the dedicated RB may also be a LCID. The LCID for the M-DRB and the LCID for the dedicated RB may be assigned by the BS 101. Then, the BS 101 may indicate that both the LCID of the M-DRB and the LCID of the dedicated DRB associate with the same RLC or ARQ entity. According to some embodiments of the present application, the BS 101 may assign the same LCID for the M-DRB and the dedicated RB.

In another embodiment of the present application, the ID of the M-DRB may be one of: a M-DRB ID, a temporary mobile group identifier (TMGI), a G-RNTI, and any other ID (for example, a new ID different from the above IDs) used to identify the M-DRB. The ID of the dedicated RB may be one of: a unicast data radio bearer (U-DRB) ID, a TMGI, a C-RNTI, and any other ID (for example, a new ID different from the above IDs) used to identify the dedicated RB.

After transmitting the configuration information, in step 304, the BS may transmit a set of RLC data packets via the M-DRB. The set of RLC data packets may include one or more RLC data packet. The set of RLC data packets may be transmitted to one or more UEs (e.g., including the UE 102 and other UEs not shown in FIG. 1) which use the PTM mode to receive the RLC data packets. According to some embodiments of the present application, the RLC packet may be referred to as a RLC PDU. Each RLC data packet may include a header portion (i.e., header or header field) and a data portion (i.e., data field). The data portion may include a RLC SDU or a RLC segment.

After transmitting the set of RLC data packets, in step 306, the BS 101 may receive feedback information for the set of RLC data packets via the dedicated RB of the UE 102 (e.g., the UE 102a or UE 102b) to which the configuration information in step 302 is transmitted. The feedback information may indicate a positive or negative acknowledgement of the data portion (i.e., a RLC SDU or RLC SDU segment) in each RLC data packet of the set of RLC data packets.

In an embodiment of the present application, the feedback information may be included in a RLC status PDU. That is, in step 306, the BS 101 may receive a RLC status PDU including the feedback information for the set of RLC data packets via the dedicated RB from the UE 102.

In response to the feedback information indicating at least one negative acknowledgement (NACK) for at least one RLC data packet (or data portion of the at least one RLC data packet) of the set of RLC data packets, the BS 101 may retransmit the at least one RLC data packet via the dedicated RB to the UE. In other words, the BS 101 may retransmit the data portion of the at least one RLC data packet via the dedicated RB to the UE 102.

The specific implementation process of the above steps 302-306 will be specifically illustrated with reference to FIG. 5.

Figure 5:
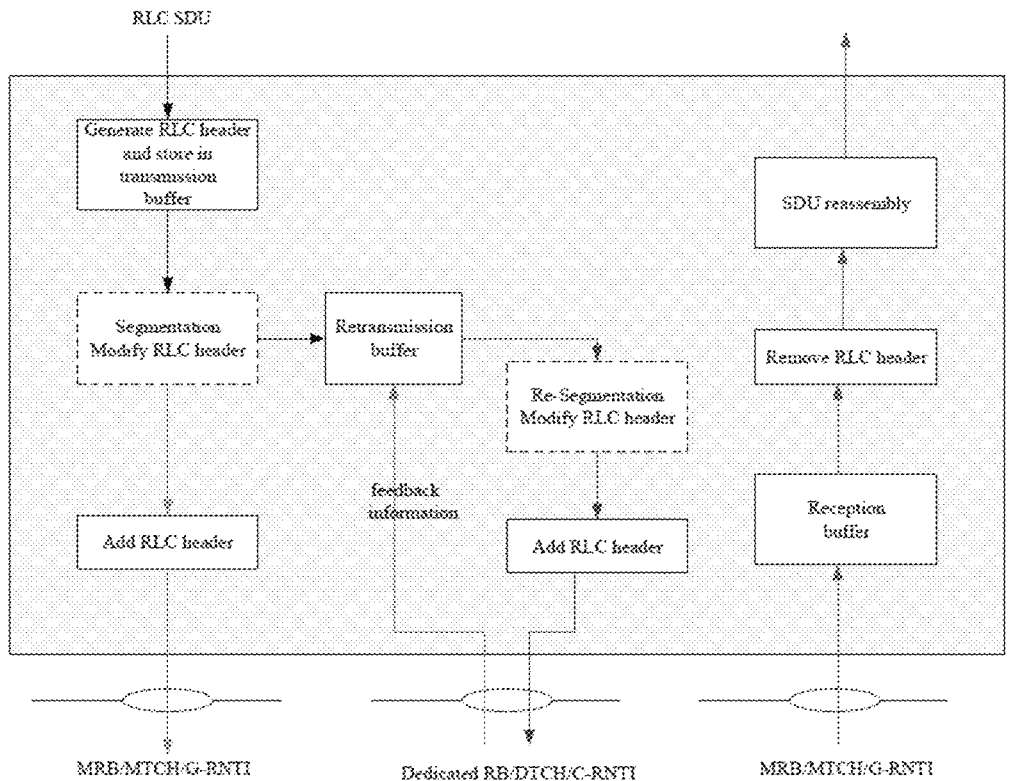
FIG. 5 is a schematic diagram illustrating a RLC entity for MBS according to some embodiments of the present application.

For example, FIG. 5 is a schematic diagram illustrating a RLC entity for MBS according to some embodiments of the present application. The RLC entity shown in FIG. 5 can be either the RLC entity of the BS 101 or the RLC entity of the UE 102.

Referring to FIG. 5, for each RLC SDU received from the upper layer than the RLC layer, the RLC entity, e.g., the transmitting side of the RLC entity, may first generate a RLC header for the RLC SDU and store the RLC SDU in a transmission buffer. When a layer lower than the RLC layer (e.g., the MAC layer, or the physical layer) indicates a transmission opportunity to the RLC entity, the RLC entity may determine whether the RLC SDU together with the RLC header can be transmitted within the time-frequency resource indicated by the transmission opportunity.

When the RLC SDU together with the RLC header can be transmitted within the time-frequency resource indicated by the transmission opportunity, it means that the time-frequency resource is sufficient for the RLC SDU transmission and the RLC SDU does not need to be segmented. In this situation, the RLC entity, e.g., the transmitting side of the RLC entity, may add a RLC header to the RLC SDU to generate a RLC data PDU. After that, the RLC entity, e.g., the transmitting side of the RLC entity, may submit the RLC data PDU to a multicast traffic channel (MTCH) associated with the M-DRB and corresponding G-RNTI.

In the case that the time-frequency resource indicated by the transmission opportunity is not sufficient enough for transmitting the RLC SDU and the RLC header, the RLC entity, e.g., the transmitting side of the RLC entity may segment the RLC SDU to generate a plurality of RLC SDU segments and modify the RLC header so that one of the plurality of RLC SDU segments fit the time-frequency resource indicated by the transmission opportunity and the modified header can indicate information for the RLC SDU segments. The RLC entity, e.g., the transmitting side of the RLC entity, may add the modified RLC header to the RLC SDU segment to generate a RLC data PDU. After that, the RLC entity, e.g., the transmitting side of the RLC entity, may submit the RLC data PDU to a MTCH associated with the M-DRB and the corresponding G-RNTI. The RLC SDU or the RLC SDU segment may be stored in a retransmission buffer for necessary retransmission.

The RLC entity can receive feedback information (e.g., the RLC status report) for the RLC data PDU (in other words, the data portion, e.g., RLC SDU or a RLC SDU segment) from the dedicated traffic channel (DTCH) associated with the dedicated RB and corresponding C-RNTI.

In the case that the feedback information indicates a negative acknowledgement of the RLC SDU or the RLC SDU segment, the RLC entity, e.g., the transmitting side of the RLC entity, may perform retransmission for the RLC SDU or the RLC SDU segment. When retransmitting the RLC SDU or the RLC SDU segment, the RLC entity may, if needed, re-segment the RLC SDU or the RLC SDU segment to form a new RLC data PDU which fits the time-frequency resource indicated by a transmission opportunity notified by the layer lower than the RLC layer.

When receiving a RLC data PDU from a MTCH associated with the M-DRB and corresponding G-RNTI, the RLC entity, e.g., the receiving side of the RLC entity, may either discard the received RLC data PDU or place it in the reception buffer, remove the RLC header, reassemble the RLC SDU (if needed), and deliver the RLC SDU to an upper layer higher than the RLC layer in order.

According to some embodiments of the present application, the feedback information (e.g., the RLC status report or RLC status PDU) received in step 306 may be triggered to be transmitted by the receiving RLC entity via a polling procedure. The polling procedure may be initiated by the transmitting RLC entity (e.g., the RLC entity of the BS 101). When the transmitting RLC entity initiates the polling procedure, it may transmit a polling indication to the receiving RLC entity.

According to some embodiments of the present application, when a condition is satisfied, the BS 101 may transmit a polling indication indicating that the feedback information is needed to be transmitted by the UE 102, wherein the condition is one of the followings: a number of the set of RLC data packets (e.g., RLC data PDUs) is larger than or equal to a first threshold number; a number of bytes of data portion (e.g., a RLC SDU and/or RLC SDU segment) of the set of RLC data packets is larger than or equal to a second threshold number; a transmission buffer and a retransmission buffer become empty; and no new RLC SDU needed to be transmitted. In an embodiment of the present application, the first threshold number may be referred to as a parameter pollPDU, which is used by the transmitting RLC entity to trigger a poll for every pollPDU PDUs. In another embodiment of the present application, the second threshold number may be referred to as a parameter pollByte, which is used by the transmitting RLC entity to trigger a poll for every pollByte byte. For each UE, dedicated pollPDU and pollByte can be configured by the BS 101, that is, the pollPDU and poll Byte may be UE specific.

Figure 6:
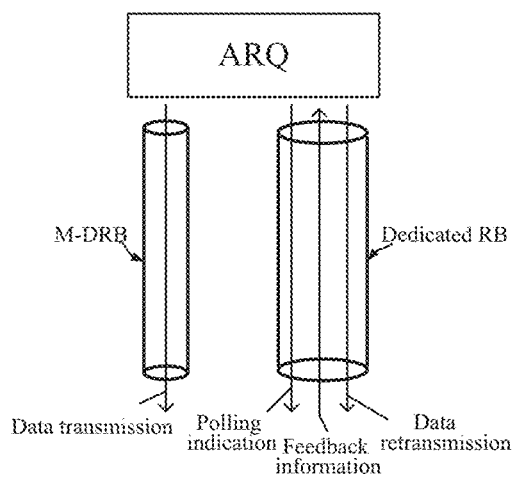
FIG. 6 illustrates an example of transmitting a polling indication according to some embodiments of the present application.

According to some embodiments of the present application, the polling indication may be transmitted via the dedicated RB as shown in FIG. 6. Referring to FIG. 6, the M-DRB may be used for data transmission by the ARQ to all associated UEs using a PTM mode to receive RLC data packets, while a dedicated RB is UE individual. For a specific UE, the dedicated RB may be used for transmitting feedback information, receiving data retransmission, and receiving polling indication.

In some embodiments of the present application, e.g., as stated above, the polling indication may be transmitted in one of a polling control PDU, an AMD PDU with padding data, and an unacknowledged mode data (UMD) PDU via the dedicated RB.

Figure 7:
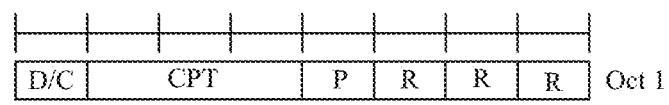
FIG. 7 illustrates an example of a polling control PDU according to some embodiments of the present application.

FIG. 7 illustrates an example of a polling control PDU according to some embodiments of the present application. Referring to FIG. 7, the size of the polling control PDU is 1 byte. The polling control PDU may include a D/C field with 1 bit indicating that the RLC PDU is a RLC data PDU or RLC control PDU. For example, Table 1 shows the value of the D/C field.

TABLE 1

| Value | Description |
|---|---|
| 0 | RLC control PDU |
| 1 | RLC data PDU |

Referring to Table 1, the D/C field with value "0" may indicate that the RLC PDU is a RLC control PDU, and the D/C field with value "1" may indicate that the RLC PDU is a RLC data PDU.

The polling control PDU may also include a control PDU type (CPT) field with 3 bits indicating the type of the RLC control PDU. For example, Table 2 shows the value of the CPT field.

TABLE 2

| Value | Description |
|---|---|
| 000 | RLC status PDU |
| 001 | Polling control PDU |
| 002 | Reserved (PDUs with this coding will be discarded by the receiving entity for this release of the protocol) |

Referring to Table 2, the CPT field with value "000" may indicate that the PDU is a RLC status PDU used for transmitting feedback information, and the CPT field with value "000" may indicate that the PDU is a polling control PDU for transmitting the polling indication.

The polling control PDU may also include a polling filed (i.e., the P filed) with 1 bit indicating whether or not the transmitting AM RLC entity requests feedback information (e.g., a status report) from the receiving AM RLC entity. For example, the P field with value "1" may be used as the polling indication indicating that the feedback information is needed to be transmitted by the UE 102. The polling control PDU may also include a reserved (R) field with three bits.

Figure 8:
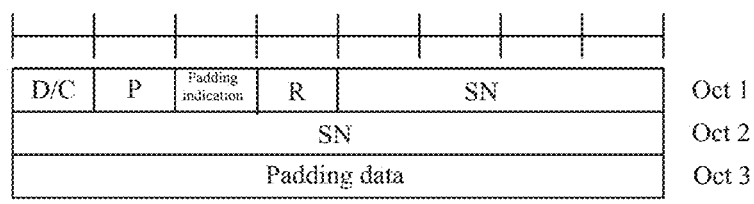
FIG. 8 illustrates an example of a AMD PDU with padding data according to some embodiments of the present application.

FIG. 8 illustrates an example of an AMD PDU with padding bit. Referring to FIG. 8, the size of the AMD PDU is 3 bytes. The AMD PDU may include a padding data with 1 byte and an AMD PDU header with two bytes. The AMD PDU header may include:
- a D/C field with 1 bit which has the same definition as that in FIG. 7;
- a P field with 1 bit, wherein the P field with value "1" may be used as the polling indication indicating that the feedback information is needed to be transmitted by the UE 102;
- a padding indication field indicate that the AMD PDU is different from the normal AMD PDU as shown in FIG. 2 and is just used as a format for transmitting the polling indication;
- a reserved (R) field with 1 bit; and
- a SN field with 12 bits.

The values of the SN and one byte padding data may be arbitrary. After receiving the above AMD PDU, the UE 102 may discard the SN and padding data, and the feedback information (in other words, a RLC status report or RLC status PDU) is triggered based on the polling indication (i.e., a P field).

Figure 9:
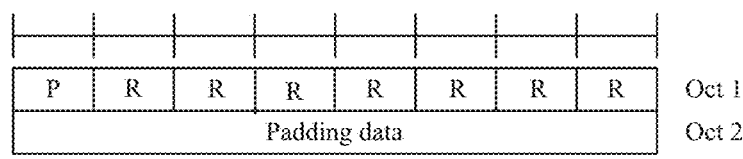
FIG. 9 illustrates an example of a UMD PDU according to some embodiments of the present application.

FIG. 9 illustrates an example of a UMD PDU. Referring to FIG. 9, the size of the UMD PDU is 2 bytes. The UMD PDU may include a padding data with 1 byte and a UMD PDU header with 1 byte. The UMD PDU header may include:
- a P field with 1 bit, wherein the P field with value "1" may be used as the polling indication indicating that the feedback information is needed to be transmitted by the UE 102; and
- a reserved (R) field with 7 bits.

According to some other embodiments, the polling indication may be transmitted in an AMD PDU via the M-DRB. Since the AMD PDU may be transmitted to all associated UEs using a PTM mode to receive the RLC data packets, in order to notify a specific UE (for example, the UE 102) to transmit feedback information, the AMD PDU may include a UE ID of the specific UE (for example, an ID of the UE 102) to indicate the specific UE to transmit the feedback information.

Figures 10, 11:
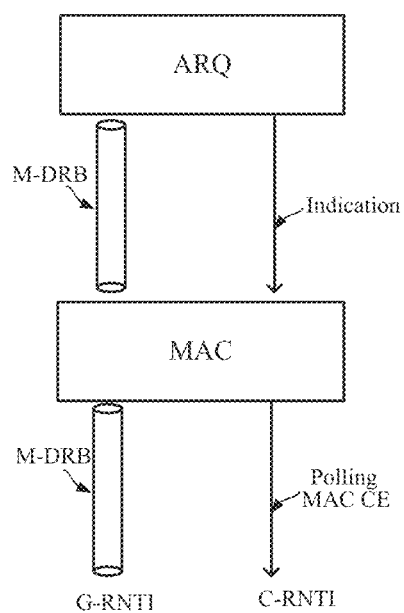
FIG. 10 illustrates another example of a AMD PDU according to some embodiments of the present application.
FIG. 11 illustrates another example of transmitting a polling indication according to some embodiments of the present application.

For example, FIG. 10 illustrates an example of an AMD PDU with UE ID. The AMD PDU in FIG. 10 may be an AMD PDU in which the RLC SDU is not segmented. Persons skilled in the art can understand that the AMD PDU shown in FIG. 10 is only for illustrative purpose, and the AMD PDU may have other formats as specified in 3GPP TS 38.322 with the newly added UE ID.

Referring to FIG. 10, the size of the AMD PDU may be M bytes, wherein M is an integer larger than 3. The AMD PDU includes a data field and a header field. The data field may include a RLC SDU. The header field may include:
- a D/C field with 1 bit indicating whether the RLC PDU is a RLC data PDU or RLC control PDU, in the example of FIG. 10, the D/C field may be set to "1" to indicate that the AMD PDU is a data PDU;
- a P field with 1 bit, wherein the P field with value "1" may be used as the polling indication indicating that the feedback information is needed to be transmitted by the UE 102; in other examples, the P field with value "0" may be used as the polling indication indicating that the feedback information is needed to be transmitted by the UE 102;
- a reserved (R) field with two bits;
- a SN field with 12 bits indicating the sequence number of the corresponding RLC SDU; and
- a UE ID field, wherein the UE ID may be a C-RNTI or other ID(s) which can be used to indicate the UE.

According to some other embodiments of the present application, the polling indication may be transmitted in a polling medium access control (MAC) control element (CE). For example, FIG. 11 illustrates another example of transmitting a polling indication according to some embodiments of the present application.

Referring to FIG. 11, the RLC data packets may be transmitted via M-DRB scrambled by G-RNTI. When the condition for triggering a polling procedure is fulfilled, the transmitting RLC entity (or the ARQ entity) of the BS 101 may start a polling procedure and send an indication to the MAC layer of the BS 101. After receiving the indication, the MAC layer of the BS 101 may generate a MAC CE. The MAC CE including a polling indication and the corresponding ID of the M-DRB may be referred to as a polling MAC CE. The BS 101 may transmit the polling MAC CE to the UE 102 by the C-RNTI of the UE 102. After receiving the polling MAC CE, the UE 102 may identify the ID of the M-DRB and forward the polling indication to the corresponding RLC entity. The RLC entity of the UE 102 may start the feedback information transmitting procedure.

Figure 12:
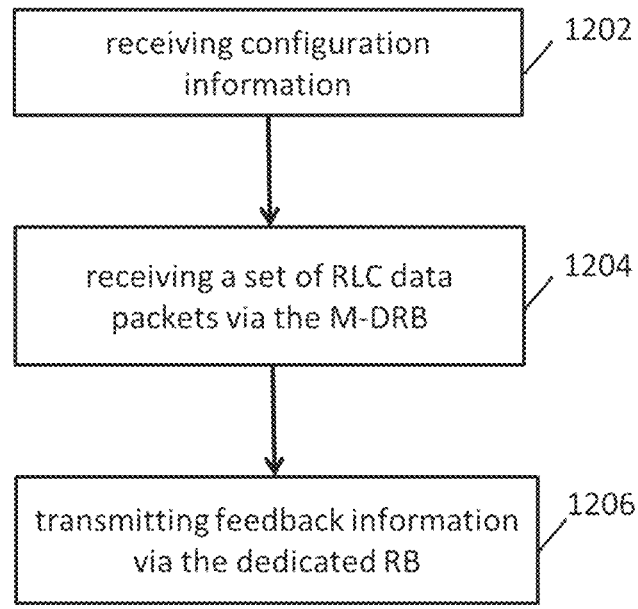
FIG. 12 is a flow chart illustrating a method for MBS according to some other embodiments of the present application.

FIG. 12 is a flow chart illustrating a method for MBS according to some other embodiments of the present application. The method may be performed by a UE (e.g., the UE 102a and the UE 102b as shown in FIG. 1).

In the exemplary method shown in FIG. 12, in step 1202, a UE 102 (e.g., the UE 102a and the UE 102b as shown in FIG. 1) may receive configuration information indicating a M-DRB and a dedicated RB both associated with a RLC entity from a BS (e.g., the BS 101).

The M-DRB may refer to a radio bearer or a RLC bearer or a leg associated with the RLC entity for data transmission via a PTM mode. The M-DRB is scrambled by a G-RNTI in at least one cell. The M-DRB can also be named as MRB. The dedicated RB may refer to a radio bearer or a RLC bearer or a leg associated with the RLC entity for feedback information and retransmission for the UE 102 via a PTP mode. The dedicated RB is scrambled by the C-RNTI of the UE.

In some embodiments, the M-DRB and the dedicated RB both associated with a RLC entity may refer to that the M-DRB and the dedicated RB are both associated with the same ARQ entity in the RLC entity as shown in FIG. 4.

The association between the same ARQ entity, the M-DRB and the dedicated RB may be indicated by associating an ID of the M-DRB and an ID of the dedicated RB with the same RLC entity or ARQ entity.

In an embodiment of the present application, the ID of the M-DRB may be a LCID and the ID of the dedicated RB may be a LCID, which may be assigned by The BS 101. Then, the BS 101 may indicate that both the LCID of the M-DRB and the LCID of the dedicated DRB associates with the same RLC or ARQ entity. According to some embodiments of the present application, the BS 101 may assign same LCID for the M-DRB and the dedicated RB.

In another embodiment of the present application, the ID of the M-DRB may be one of: a M-DRB ID, a TMGI, a G-RNTI, and any other ID (for example, a new ID different from the above IDs) which is used to identify the M-DRB. The ID of the dedicated RB may be one of: a U-DRB ID, a TMGI, a C-RNTI, and any other ID (for example, a new ID different from the above IDs) which is used to identify the dedicated RB.

After receiving the configuration information, in step 1204, the UE 102 may receive a set of RLC data packets via the M-DRB in the PTM mode. The set of RLC data packets may include one or more RLC data packets. According to some embodiments of the present application, the RLC packet(s) may be referred to as a RLC PDU. Each RLC data packet may include a header portion (e.g., a header or header field) and a data portion (e.g., a data field). The data portion may include a RLC SDU or a RLC segment.

After receiving the set of RLC data packets, in step 1206, the UE 102 may transmit feedback information for the set of RLC data packets via the dedicated RB to the BS 101. The feedback information may indicate a positive or negative acknowledgement of the data portion (i.e., RLC SDU or RLC SDU segment) in each RLC data packet of the set of RLC data packets.

In an embodiment of the present application, the feedback information may be included in a RLC status PDU. That is, in step 1206, the UE 102 may transmit a RLC status PDU including the feedback information for the set of RLC data packets via the dedicated RB to the BS 101.

In response to the feedback information indicating at least one NACK for at least one RLC data packet (or data portion of the at least one RLC data packet) of the set of RLC data packets, the UE 102 may receive a retransmission of the at least one RLC data packet via the dedicated RB to the UE. In other words, the UE 102 may receive a retransmission of data portion of the at least one RLC data packet via the dedicated RB to the UE 102.

According to some embodiments of the present application, the UE 102 may receive a polling indication via the dedicated RB as shown in FIG. 6. In these embodiments, the polling indication may be received in one of a polling control PDU as shown in FIG. 7, an AMD PDU with padding data as shown in FIG. 8, and an UMD PDU as shown in FIG. 9. In response to receiving the polling indication, the UE 102 may transmit the feedback information (in other words, the RLC status report or the RLC status PDU) to the BS 101.

According to some other embodiments, the UE 102 may receive a polling indication in an AMD PDU via the M-DRB. In these embodiments of the present application, the AMD PDU may include an UE ID of the specific UE to indicate the specific UE to transmit the feedback information. For example, the AMD PDU with UE ID may be shown in FIG. 10. In other embodiments, the AMD PDU may have other formats as specified in 3GPP TS 38.322 with the newly added UE ID. After receiving the AMD PDU with UE ID, the UE 102 may check whether its UE ID matches the UE ID included in the AMD PDU, in the case that the UE ID of the UE 102 matches the UE ID included in the AMD PDU, the UE 102 may transmit the feedback information (in other words, the RLC status report or the RLC status PDU) to the BS 101.

According to some other embodiments of the present application, the UE 102 may receive a polling indication in a polling MAC CE as shown in FIG. 11. After receiving the polling MAC CE, the UE 102 may identify the ID of the M-DRB and forwards the polling indication to the corresponding RLC entity. In response to receiving the polling indication, the RLC entity may start the feedback information transmitting procedure.

According to some other embodiments of the present application, the UE 102 may receive a polling indication (e.g., the P field) in an AMD PDU as specified in 3GPP standard document TS 38.322 (for example, the AMD PDU as shown in FIG. 2). After receiving the polling indication, different from the existing technology in which the UE 102 may transmit the feedback information at the first transmission opportunity after receiving the polling indication, the UE 102 may perform the feedback information transmission conditionally. The existing P bit in the AMD PDU header can be reused. However, when receiving the P bit, the UE may perform the feedback information transmission based on some pre-configured conditions in order to avoid all associated UEs performing the feedback information at the same time.

In an embodiment of the present application, the UE 102 may receive the polling indication in the AMD PDU via the M-DRB. In response to that at least one RLC data packet is not successfully received in a window associated with the AMD PDU, the UE 102 may transmit the feedback information. In the case that all the RLC data packets are successfully received in the window associated with the AMD PDU, the UE 102 may not transmit the feedback information. In some embodiments, the time receiving the polling indication may be used as the starting point of window. In some other embodiments, the time receiving the polling indication may be used as the end point of window. The window length for each UE may be configured by the BS 101

For example, when an AMD PDU with SN=x and the P field set to "1" is received, if all RLC SDUs or RLC segments are successfully received in a window associated with the AMD PDU (for example, the time receiving the AMD PDU may be used as the start point of the window), the UE 102 may not trigger the feedback information transmission, else if there is at least one RLC SDU or RLC segment is not successfully received yet, the UE may trigger the feedback information transmission.

In another embodiment of the present application, the UE 102 may receive the polling indication in the AMD PDU via the M-DRB. Then, the UE 102 may transmit the feedback information in a transmission opportunity, wherein the transmission opportunity is determined based on a first transmission opportunity after receiving the polling indication and an offset. For example, the transmission opportunity may be determined based on the first transmission opportunity plus the offset. The offset may be configured by the BS 101 with the value larger than or equal to zero. For each UE, the BS 101 may configure an offset for it. In some embodiments, different UE may be configured with a different transmission opportunity with different offset.

For example, when an AMD PDU with SN=x and the P field set to "1" is received, the UE 102 may not transmit the feedback information at the first transmission opportunity indicated by the lower layer used for transmitting the feedback information. Instead, the transmission opportunity will be delayed with a configured offset, and then the UE 102 may construct a status PDU including the feedback information and submit it to the lower layer at the delayed transmission opportunity.

In yet another embodiment of the present application, the UE 102 may receive the polling indication in the AMD PDU via the M-DRB. However, whether to transmit the feedback information may be based on a status prohibit timer. That is, in response to that a status prohibit timer is not running, the UE 102 may transmit the feedback information. In response to that the status prohibit timer is running, the UE 102 may not transmit the feedback information. The status prohibit timer may be started or restarted after the feedback information is transmitted by the UE 102. For each UE, the BS 101 may configure the value of the status prohibit timer. In some embodiments, the values of the status prohibit timer of different UEs may be configured to be different. In an embodiment of the present application, the status prohibit timer may be referred to as a parameter t-StatusProhibit.

For example, when an AMD PDU with SN=x and the P field set to "1" is received, the UE 102 may check whether the timer t-StatusProhibit is running. In the case that the timer t-StatusProhibit is not running, the UE may construct a status PDU including the feedback information and submit it to the lower layer at the first transmission opportunity indicated by the lower layer.

Figure 13:
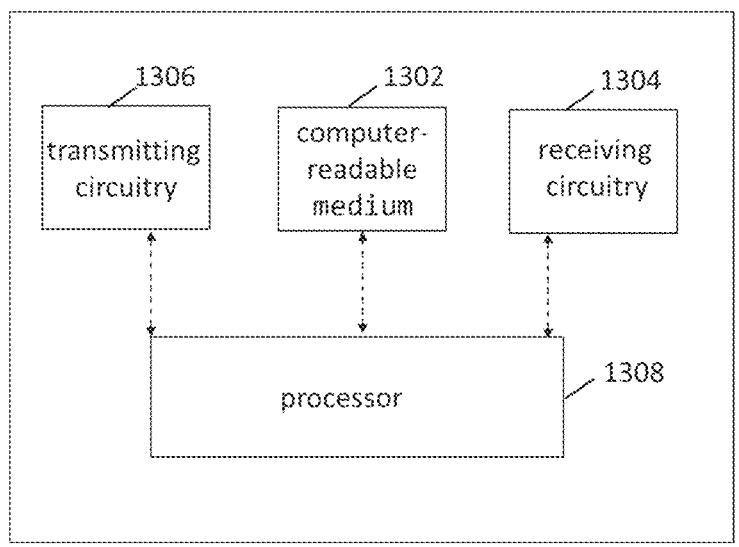
FIG. 13 illustrates a simplified block diagram of an apparatus for MBS according to some embodiments of the present application.

FIG. 13 illustrates a simplified block diagram of an apparatus 1300 for MBS according to some embodiments of the present application. The apparatus 1300 may be a UE 102 (for example, the UE 102a or the UE 102b) or a BS 101 as shown in FIG. 1.

Referring to FIG. 13, the apparatus 1300 may include at least one non-transitory computer-readable medium 1302, at least one receiving circuitry 1304, at least one transmitting circuitry 1306, and at least one processor 1308. In some embodiment of the present application, at least one receiving circuitry 1304 and at least one transmitting circuitry 1306 and be integrated into at least one transceiver. The at least one non-transitory computer-readable medium 1302 may have computer executable instructions stored therein. The at least one processor 1308 may be coupled to the at least one non-transitory computer-readable medium 1302, the at least one receiving circuitry 1304 and the at least one transmitting circuitry 1306. The computer executable instructions can be programmed to implement a method with the at least one receiving circuitry 1304, the at least one transmitting circuitry 1306 and the at least one processor 1308. The method can be a method according to an embodiment of the present application, for example, the method shown in FIG. 3 or FIG. 12.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for MBS, including a processor and a memory. Computer programmable instructions for implementing a method for MBS are stored in the memory, and the processor is configured to perform the computer programmable instructions to implement the method for MBS. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for MBS as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A method performed by a base station (BS), the method comprising:
   transmitting configuration information indicating a multicast data radio bearer (M-DRB) and a dedicated radio bearer (RB) both associated with a radio link control (RLC) entity;
   transmitting a set of RLC data packets to one or more user equipment (UEs) via the M-DRB in a point to multipoint (PTM) mode; and
   receiving feedback information for the set of RLC data packets via the dedicated RB of a UE of the one or more UEs.

2. The method of claim 1, further comprising:
   in response to the feedback information indicating at least one negative acknowledgement (NACK) for at least one RLC data packet of the set of RLC data packets, retransmitting the at least one RLC data packet via the dedicated RB to the UE.

3. The method of claim 1, further comprising:
   when a condition is satisfied, transmitting a polling indication indicating that the feedback information is needed to be transmitted, wherein the condition is one of:

a number of RLC data packets in the set of RLC data packets is larger than or equal to a first threshold number;

a number of bytes of a data portion of the set of RLC data packets is larger than or equal to a second threshold number;

a transmission buffer and a retransmission buffer become empty; or no new RLC data service data unit (SDU) is to be transmitted.

4. The method of claim 3, wherein the polling indication is transmitted in one of a polling control protocol data unit (PDU), an acknowledge mode data (AMD) PDU with padding data, or an unacknowledged mode data (UMD) PDU via the dedicated RB of the UE.

5. The method of claim 3, wherein the polling indication is transmitted in an acknowledge mode data (AMD) protocol data unit (PDU) via the M-DRB, wherein the AMD PDU comprises a UE identity (ID).

6. The method of claim 3, wherein the polling indication is transmitted in a polling medium access control (MAC) control element (CE).

7. A user equipment (UE) for wireless communication, comprising:
at least one memory; and
at least one processor coupled with the at least one memory and configured to cause the UE to:
receive configuration information indicating a multicast data radio bearer (M-DRB) and a dedicated radio bearer (RB) both associated with a radio link control (RLC) entity;
receive a set of RLC data packets via the M-DRB in a point to multipoint (PTM) mode; and
transmit feedback information for the set of RLC data packets via the dedicated RB.

8. The UE of claim 7, wherein the at least one processor is further configured to cause the apparatus UE to:
in response to the feedback information indicating at least one negative acknowledgement (NACK) for at least one RLC data packet of the set of RLC data packets, receive a retransmission of the at least one RLC data packet via the dedicated RB.

9. The UE of claim 7, wherein the at least one processor is further configured to cause the UE to:
receive a polling indication via the dedicated RB, wherein the polling indication is included in one of a polling control protocol data unit (PDU), an acknowledge mode data (AMD) PDU with padding data, or an unacknowledged mode data (UMD) PDU; and
in response to receiving the polling indication, transmit the feedback information.

10. The UE of claim 7, wherein the at least one processor is further configured to cause the UE to:
receive a polling indication in an acknowledge mode data (AMD) protocol data unit (PDU) via the M-DRB, wherein the AMD PDU comprises a user equipment (UE) identity (ID); and
in response to receiving the polling indication, transmit the feedback information.

11. The UE of claim 7, wherein the at least one processor is further configured to cause the UE to:
receive a polling indication in a polling medium access control (MAC) control element (CE);
forward the polling indication to a RLC layer; and
in response to receiving the polling indication, transmit the feedback information.

12. The UE of claim 7, wherein the at least one processor is further configured to cause the UE to:
receive a polling indication in an acknowledge mode data (AMD) protocol data unit (PDU) via the M-DRB in the PTM mode; and
in response to at least one RLC data packet not being successfully received in a window associated with the AMD PDU, transmit the feedback information.

13. The UE of claim 7, wherein the at least one processor is further configured to cause the UE to:
receive a polling indication in an acknowledge mode data (AMD) protocol data unit (PDU) via the M-DRB in the PTM mode; and
transmit the feedback information in a transmission opportunity, wherein the transmission opportunity is determined based on a first transmission opportunity after receiving the polling indication and an offset.

14. The UE of claim 7, wherein the at least one processor is further configured to cause the UE to:
receive a polling indication in an acknowledge mode data (AMD) protocol data unit (PDU) via the M-DRB; and
in response to a status prohibit timer not running, transmit the feedback information.

15. A base station (BS) for wireless communication, comprising:
at least one memory; and
at least one processor coupled with the at least one memory and configured to cause the BS to:
transmit configuration information indicating a multicast data radio bearer (M-DRB) and a dedicated radio bearer (RB) both associated with a radio link control (RLC) entity;
transmit a set of RLC data packets to one or more user equipment (UEs) via the M-DRB in a point to multipoint (PTM) mode; and
receive feedback information for the set of RLC data packets via the dedicated RB of a UE of the one or more UEs.

16. The BS of claim 15, wherein the at least one processor is further configured to cause the BS to:
in response to the feedback information indicating at least one negative acknowledgement (NACK) for at least one RLC data packet of the set of RLC data packets, retransmit the at least one RLC data packet via the dedicated RB to the UE.

17. The BS of claim 15, wherein the at least one processor is further configured to cause the BS to:
when a condition is satisfied, transmit a polling indication indicating that the feedback information is needed to be transmitted, wherein the condition is one of:
a number of RLC data packets in the set of RLC data packets is larger than or equal to a first threshold number;
a number of bytes of a data portion of the set of RLC data packets is larger than or equal to a second threshold number;
a transmission buffer and a retransmission buffer become empty; or
no new RLC data service data unit (SDU) is to be transmitted.

18. The BS of claim 17, wherein the polling indication is transmitted in one of a polling control protocol data unit (PDU), an acknowledge mode data (AMD) PDU with padding data, or an unacknowledged mode data (UMD) PDU via the dedicated RB of the UE.

19. The BS of claim 17, wherein the polling indication is transmitted in an acknowledge mode data (AMD) protocol data unit (PDU) via the M-DRB, wherein the AMD PDU comprises a UE identity (ID).

20. A method performed by a user equipment (UE), the method comprising:
- receiving configuration information indicating a multicast data radio bearer (M-DRB) and a dedicated radio bearer (RB) both associated with a radio link control (RLC) entity;
- receiving a set of RLC data packets via the M-DRB in a point to multipoint (PTM) mode; and
- transmitting feedback information for the set of RLC data packets via the dedicated RB.

* * * * *